(12) United States Patent
Rudak et al.

(10) Patent No.: US 12,028,496 B2
(45) Date of Patent: Jul. 2, 2024

(54) MULTI-MODE SCANNING CAMERA SYSTEM AND METHOD

(71) Applicant: Imaging Business Machines LLC, Birmingham, AL (US)

(72) Inventors: Peter Rudak, Hilton, NY (US); Robert L. Babanats, Vestavia Hills, AL (US)

(73) Assignee: Imaging Business Machines LLC, Birmingham, AL (US)

( * ) Notice: Subject to any disclaimer, the term of this patent is extended or adjusted under 35 U.S.C. 154(b) by 505 days.

(21) Appl. No.: 17/178,425

(22) Filed: Feb. 18, 2021

(65) Prior Publication Data

US 2021/0266420 A1 Aug. 26, 2021

Related U.S. Application Data

(60) Provisional application No. 62/979,542, filed on Feb. 21, 2020.

(51) Int. Cl.
| | | |
|---|---|---|
| H04N 1/04 | (2006.01) | |
| H04N 1/00 | (2006.01) | |
| H04N 1/028 | (2006.01) | |
| H04N 1/10 | (2006.01) | |
| H04N 1/195 | (2006.01) | |
| H04N 5/33 | (2023.01) | |
| H04N 23/10 | (2023.01) | |
| G09B 3/06 | (2006.01) | |

(52) U.S. Cl.
CPC ..... *H04N 1/02865* (2013.01); *H04N 1/00413* (2013.01); *H04N 1/00819* (2013.01); *H04N 1/10* (2013.01); *H04N 1/19594* (2013.01); *H04N 5/33* (2013.01); *H04N 23/10* (2023.01); *G09B 3/06* (2013.01)

(58) Field of Classification Search
USPC .................. 358/509, 475, 505, 483
See application file for complete search history.

(56) References Cited

U.S. PATENT DOCUMENTS

| | | | | |
|---|---|---|---|---|
| 8,861,043 B2* | 10/2014 | Lee | ...................... | H04N 1/3263 |
| | | | | 358/504 |
| 2005/0256807 A1* | 11/2005 | Brewington | ....... | G06Q 20/3674 |
| | | | | 340/5.86 |
| 2005/0270601 A1* | 12/2005 | Rodrigues | .......... | H04N 1/00236 |
| | | | | 358/401 |
| 2007/0205355 A1* | 9/2007 | Kikuchi | ................. | H04N 1/203 |
| | | | | 250/234 |

* cited by examiner

*Primary Examiner* — Cheukfan Lee
(74) *Attorney, Agent, or Firm* — Harris Beach PLLC (57) ABSTRACT

A multi-mode document scanning system includes a scanning bed configured to transport a plurality of documents through a scanning area. A scanning camera is configured to image the documents. At least one illumination bank includes a plurality of illumination elements of at least two different light wavelengths interspersed on at least one illumination bank. An illumination source switching assembly controls at last some elements of one wavelength. A selection process selects a wavelength appropriate to a document to be scanned, and instructs a processor operatively coupled to the illumination source switching assembly to illuminate elements of that wavelength. A multi-mode scanning method of document scanning is also described.

7 Claims, 8 Drawing Sheets

FIG. 4A  White LED Calibration Process

FIG. 4B

IR LED Calibration Process

FIG. 4C

RGB LED Calibration Process

FIG. 4D

UV LED Calibration Process

FIG. 5

MULTI-MODE SCANNING CAMERA SYSTEM AND METHOD

CROSS-REFERENCE TO RELATED APPLICATIONS

This application claims priority to and the benefit of U.S. provisional patent application Ser. No. 62/979,542, MULTI-MODE SCANNING CAMERA SYSTEM AND METHOD, filed Feb. 21, 2020, which application is incorporated herein by reference in its entirety.

FIELD OF THE APPLICATION

The application relates to document scanners, particularly visible light and IR document scanners.

BACKGROUND

High speed document scanners are costly to acquire and operate. High speed document scanners are typically color (RGB) scanners. Specialized IR document scanners are also available, such as to grade pencil marked test sheets.

SUMMARY

A multi-mode document scanning system includes a scanning bed configured to transport a plurality of documents through a scanning area. A scanning camera is configured to image the documents. At least one illumination bank includes a plurality of illumination elements of at least two different light wavelengths interspersed on at least one illumination bank. An illumination source switching assembly controls at least some elements of one wavelength. A selection process selects a wavelength appropriate to a document to be scanned, and instructs a processor operatively coupled to the illumination source switching assembly to illuminate elements of that wavelength.

The scanning camera can include a linear scanner. The linear scanner can include a linear RGB CCD scanner. The linear RGB CCD scanner can include separate rows of R detector pixels, G detector pixels, and B detector pixels. The multi-mode document scanning system can further include a delay process to account for a physical distance between each of a row of R detector pixels, a row of G detector pixels, and a row of B detector pixels.

The selection process to select the wavelength appropriate to the documents to be scanned can include a user graphical user interface including at least two choices of types of the documents, a type of document to be manually selected by a user or operator of the multi-mode document scanning system.

The multi-mode document scanning system can include a white light source and an IR light source, or include a R light source, a G light source, a B light source, and the IR light source. The multi-mode document scanning system can further include a UV light source, where a corresponding UV illumination of the documents causes a visible light detectable by the scanning camera.

A multi-mode scanning method of document scanning includes positioning a document on a scanning bed, positioning a scanning camera above the scanning bed; configuring the scanning camera to detect visible or infrared illumination from the document to be scanned; alternatively illuminating the document from a light bank containing illuminating elements of an IR wavelength or a visible light wavelength; and controlling elements of each wavelength corresponding to a type of document being scanned as set by a selection process to select a wavelength appropriate to the document to be scanned.

The method can further include controlling a UV light source where a scanning camera detects a visible light from the document as detected by the scanning camera.

A calibration method for a multi-mode document scanning system includes: providing a scanning bed configured to transport a plurality of documents through a scanning area, a RGB scanning camera configured to image the documents, at least one illumination bank including a plurality of illumination elements of at least two different light wavelengths interspersed on at least one illumination bank, an illumination source switching assembly to control at least some elements of one wavelength; starting a calibration; enabling the at least one illumination bank at a wavelength to cause an enabled LED illumination; capturing an array scanline, setting array pixel to 1; reading a pixel value of an array of the RGB scanning camera; adjusting the array pixel RGB offset and gain values to set pixel value to equal 80% of maximum value; incrementing to a next array pixel, check last array pixel +1?, if no repeat steps from reading a pixel value, if yes, save array pixel offset and gain values; and disabling the enabled LED illumination.

The calibration method for a multi-mode document scanning system can further included after the step of enabling, delaying for LED temperature to stabilize.

The step of enabling can include enabling a plurality of white LEDs of the illumination bank. The step of enabling can include enabling a plurality of IR LEDs of the illumination bank. The step of enabling can include enabling a plurality of RGB LEDs of the illumination bank. The step of enabling can include enabling a plurality of UV LEDs of the illumination bank.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

It is important to increase the utilization of expensive optical scanning devices. One way to do this is to ensure that the scanning device is capable of scanning documents of many varieties.

One challenging area is in scanning of test scoring sheets. These sheets use many different technologies for recording a user's answers on a sheet. For example, so called bubble sheets used in educational testing are preprinted forms containing circles or "bubbles" that are printed using a color which drops out during scanning leaving only the test taker's markings with a #2 pencil.

One method for dropping out the form information is to use "color drop-out" in the scanner, either by matching the ink color w/optical filters and/or specific wavelength illumination, or by algorithmically processing the electronic image and detecting/suppressing the specific color content. However, the above method requires a close match between the colors printed on the form and the filters, illumination, and/or parameters used in the algorithms. This color drop-out method requires preprogramming and assumptions that the color on form will not change.

As such, today's state of the art solution for these types of forms is using Infrared (IR) illumination in the cameras within a scanner. The special color inks that are used to print these forms can be selected so that they don't absorb IR light, so light is reflected back from the printed form at nearly the same level as the white paper background, effectively dropping out the form content.

On the other hand, any content that is filled out using #2 pencil or similar writing instruments absorbs IR light and the "mark" is captured as black/gray against an otherwise white background. Thus, this approach effectively drops out all colors that could be used to print these forms while preserving the content that is filled out.

While such a configuration is great for scanning test forms using carbon based writing instruments, it limits the use of the scanner to a single type of form configuration, making the scanner unable to be used for multiple purposes.

Today, a scanner system that is configured for IR applications uses cameras that have IR illumination integrated. As such, these systems need to be configured and dedicated to this type of "mark sense" application, because IR illumination cannot be used for normal scanning of human-visible content, either in color or in B&W. Dedicated IR only hardware significantly limits the flexibility and broad usability of these types of scanners.

This Application described a new system and method capable of scanning in multiple modes with a single camera.

Security Markings—Another challenging area in scanning is the detection of security markings on documents. Many documents contain unique security markings and text data that is not visible to the human eye under normal conditions. Currency and transactional documents often contain these types of security markings.

Some classes of invisible markings are made by applying fluorescent ink or "invisible ink" to the document to be scanned. These inks become visible when subjected to ultraviolet light (UV) of a specific wavelength.

By equipping a scanner's camera with multiple illumination sources, white, RGB, IR, and/or UV, that can be selected before, or during the scan process, images of an intermixed variety of specialty documents can be captured, including, in some embodiments, those documents containing "invisible" security marks.

The camera in this Application is used for multi-function scanning, preferably scanning documents which use different forms of illumination and detection to detect or suppress certain colors or ink reflectivity.

As described hereinabove, ordinarily scanners have been designed and hardware equipped to read specific kinds of indicia/ink depending on user needs. Infrared (IR) illumination for a broad-spectrum sensitive camera (about 750 nm) will not normally reflect graphite marks (such as from a #2 pencil) so IR illumination will detect such markings as dark or black. Likewise, white or RGB illumination on a broad-spectrum sensitive camera can be used to detect a broad spectrum of content in a document, including different colors and shades.

More recent cameras which have a sensitivity to IR and visible light can be used in a new way to provide a multifunction scanner which can both scan pencil and pen marked forms as well as provide standard B&W and color scanning functionality. It was realized that by providing selectable wavelength illumination combined with scanner calibration processes, a multimode scanner can be provided which can, for example, serve as a specialized test form scoring scanner, such as during an academic testing season, while being reconfigurable to function as a more standard B&W or color scanner at other times of the year. That way the relatively high cost of such high-speed scanning machines can be better supported by the increased usability of the machine over an entire year. Moreover, by optionally adding UV illumination, the same high-speed scanner can also be used to detect materials and coatings which fluoresce, generating a visible light, such as from a security marker.

Figure 1:
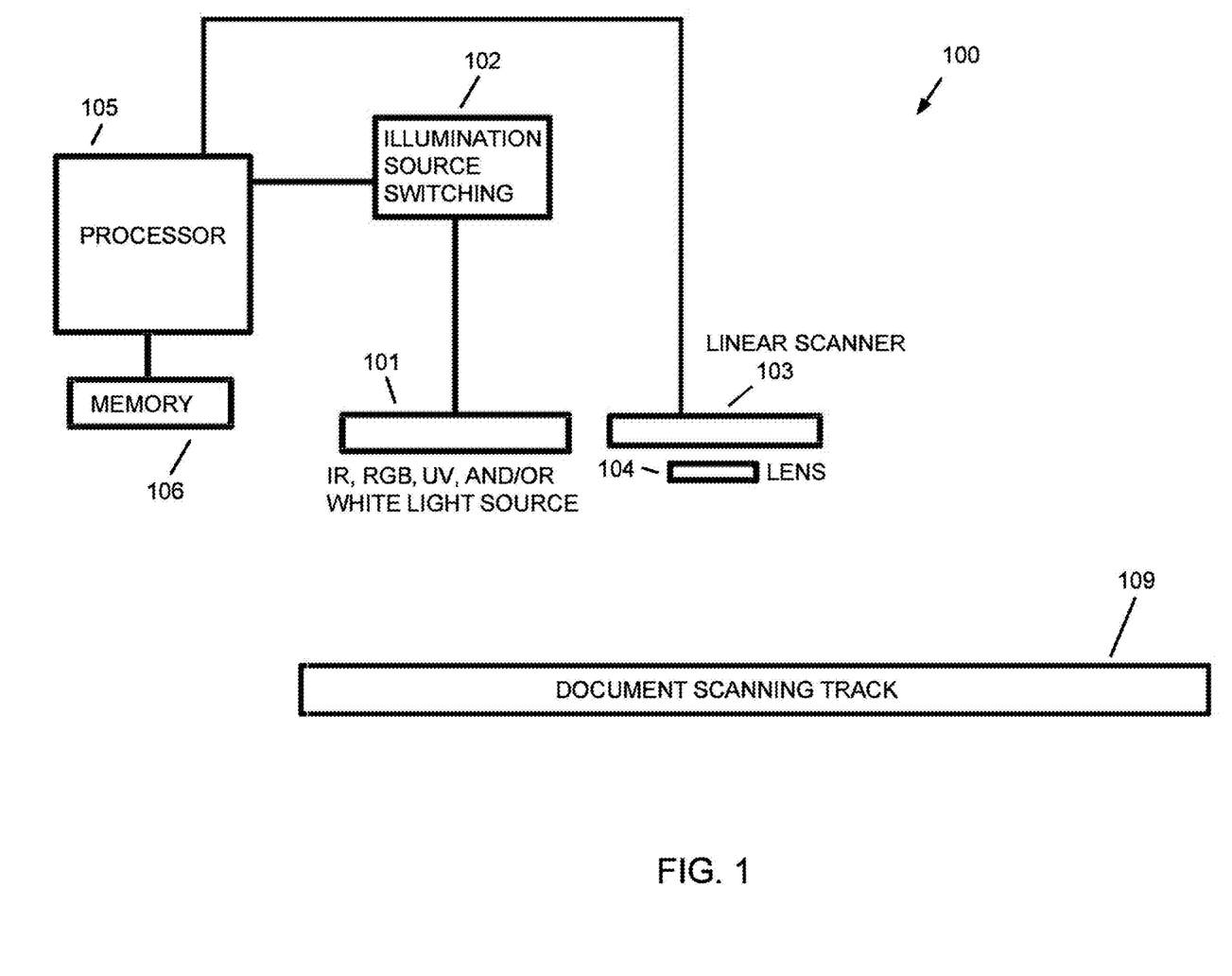
FIG. 1 is a block diagram showing an exemplary scanner according to the Application including IR, RGB, UV, and/or white light sources.

FIG. 1 is a block diagram showing an exemplary scanner according to the Application. Processor 105 is operatively coupled to the linear imaging camera 103 (linear rows of R, G, and B light detectors (e.g., CCD light detectors) and the selectable types of lights 101. Processor 105 can run the calibration processes described hereinbelow, receive image data from the linear imaging camera 103, and control the type of lights (e.g., RGB, white, IR, UV) of the selectable lights 101 which are illuminated for a scan. The documents to be scanned (any suitable papers, envelopes, currency, etc.) are typically passed through the illumination of selectable types of lights 101 and imaged by linear imaging camera 103 as they progress along any suitable type of document scanner track 109. Selectable types of lights 101 can be directly controlled and powered by processor 105, however more typically there can be an intermediate switching control electronics 102 to power the selected type of lights. Control can be on/off switching, such as most commonly according to the Application, where illumination is white light (either by white LED or combinations of RGB LEDs), or in some implementations one or more particular colors could be set by varying the intensity of the individual RGB colors).

Figure 2:
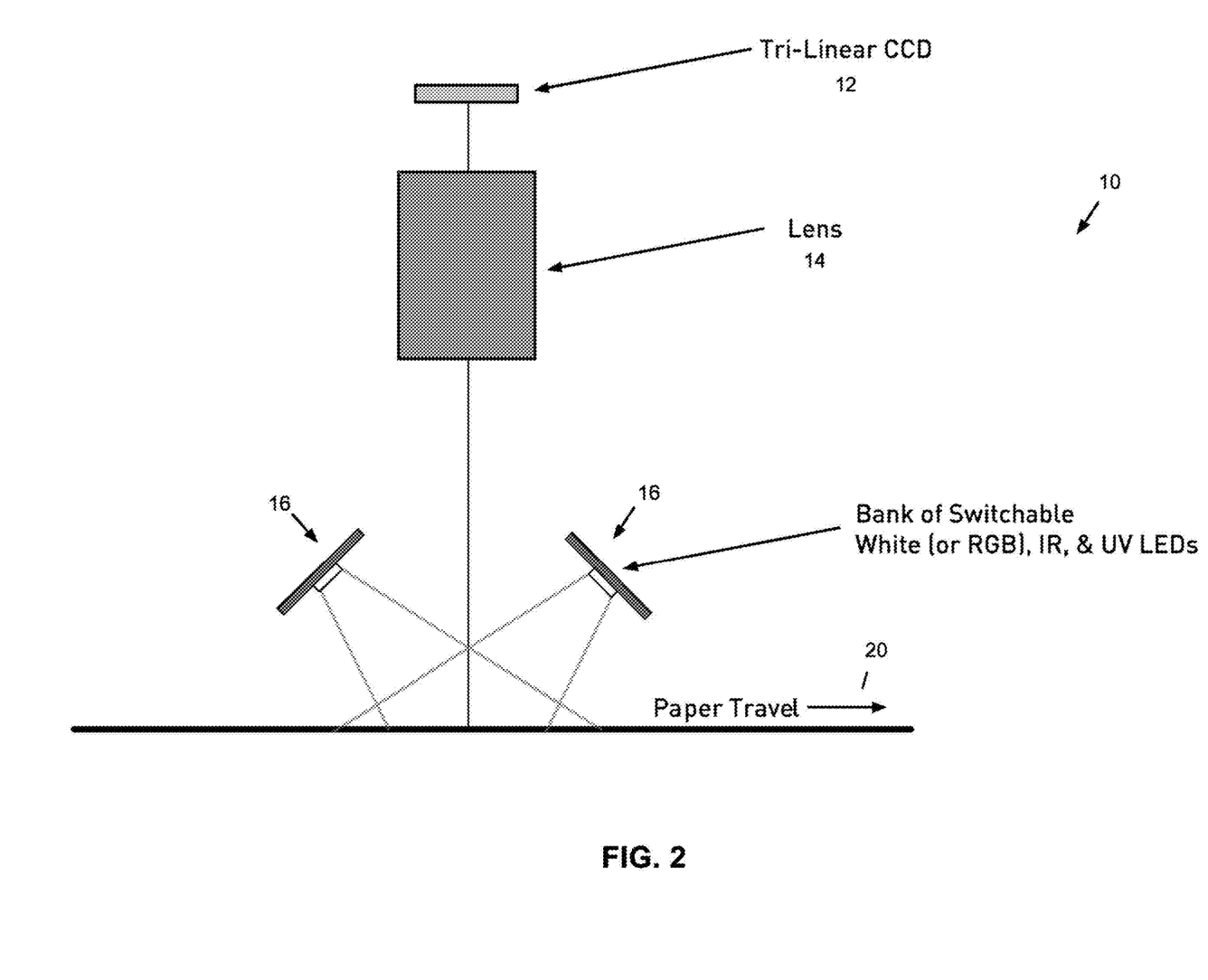
FIG. 2 shows a schematic view of an exemplary scanning system having a CCD camera (a linear imaging camera) aligned to a scanning bed upon which a document will travel.

FIG. 2 shows a schematic view of an exemplary scanning system 10 having a CCD camera 12 (a linear imaging camera) aligned to a scanning bed 20 upon which a document will travel. The lens 14 is focused on the document. The document is illuminated by one or more exemplary illumination banks 16 aimed at the document at an offset angle. The banks may also be in line with the camera but slightly offset so as not to block the camera view. Exemplary illumination banks 16 include at least one bank of switchable white (or RGB), IR, and UV LEDs. Some multimode scanners according to the Application can be made for color and IR applications without need for UV light sources.

Typically either white or RGB LEDs are used for color applications, however both white and RGB LEDs could also be present.

Figure 3:
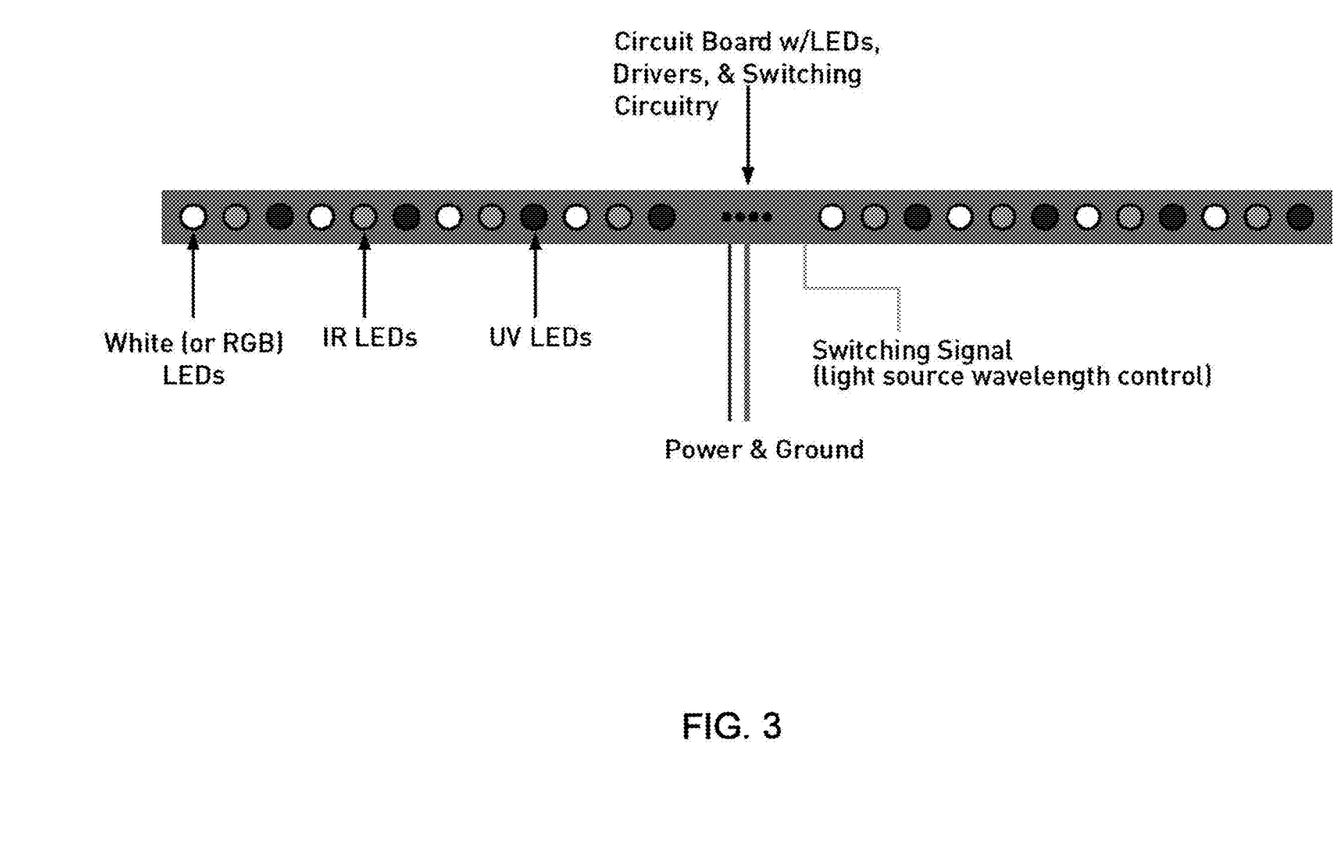
FIG. 3 shows a schematic close up of one of the banks.

FIG. 3 shows a schematic close up of one of the banks 16. Along the face of the bank are interspersed, optionally, white (or RGB) LEDs or other sources of illumination, with infra-red (IR) LEDs and optionally, also UV LEDs. These interspersed light sources can be closely packed so that the document will receive sufficient illumination with either light source activated. The exact structure of the physical arrangements of the various types of light sources is less important, any suitable physical configuration can be used.

The switching circuit 102 provides power to the selected light sources as appropriate to the document scanned. For example, if graphite marked scoring sheets are to be scanned, the system will illuminate using IR light sources. Alternatively, if non-graphite marked documents are to be scanned, the white or RGB LEDs will be illuminated. In some implementations, if UV sensitive security markings are to be scanned, UV LEDs will be illuminated. Optionally, white or RGB LEDs and UV LEDs can be illuminated simultaneously for scanning intermixed B&W or color documents and documents with security marks.

In a typical exemplary implementation, a scanner according to the Application includes a linear imaging camera 103 which is sensitive to both IR and visible light. It is unimportant if lens 104 is integral to the camera, or physically and optically added to a camera 103. There is also at least a source of substantially white light (e.g., RGB or white phosphor LEDs) and a source of IR light (typically IR LEDs). It is unimportant if the lights are integral to the linear imaging camera 103 body, or provided as one or more separate light structures (e.g., light bars, circles, etc.). Some linear imaging cameras 103 include integral white and IR light sources.

In summary, and with reference the exemplary multi-mode document scanning system of FIG. 1, a multi-mode document scanning system 100 includes a scanning bed document scanning track 109 configured to transport a plurality of documents through a scanning area. A scanning camera linear scanner 103 is configured to image the documents. At least one illumination bank IR, RGB, optional UV, and/or white light source 101 includes a plurality of illumination elements of at least two different light wavelengths interspersed on the at least one illumination bank light source 101. An illumination source switching assembly 102 controls at least some elements of one wavelength. A selection process selects a wavelength appropriate to a document to be scanned, and instructs a processor 105 operatively coupled to the illumination source switching assembly 102 to illuminate elements of that wavelength.

It was realized, however that to provide the best high quality, high speed scanning of both IR related documents (e.g., marked test sheets), and color documents, there should be a calibration processes for both types of lights, IR and white (including white by any suitable light source, including white and RGB illumination).

Most commonly, as described hereinabove, the relatively expensive highspeed scanner is implemented either as a selectable IR, or as a color document scanner.

In some implementations of a high speed scanner according to the Application, before a media is scanned, the operator uses a setup software process to select one or more of the available illumination systems to be used for scanning. Once the light type selection is made (e.g., IR or white), the scanner can be calibrated initially and/or periodically, for the illumination to be used, or for two or more different types of illumination system light. Calibration typically includes placing a specified test target under the camera system and initializing a calibration software process for that illumination system. Each illumination system can be calibrated alone or sequentially with a specific test target for the light type and/or for the typical document to be scanned (e.g., a particular test sheet for scoring). Typically, calibration is only performed during an initial setup of the illumination system and optionally, for a periodic recalibration (e.g., to compensate for light source aging).

In some implementations, the calibration software process can adjust a light output intensity of each illumination system (different types of light) to maximize the dynamic range of the scanner's camera system without driving the imaged output into saturation.

Calibration Processes (IR, White or RGB, UV if Present)

Multi-mode scanning camera systems according to the Application should be calibrated at least once, or more typically periodically, for either or both of IR and color scanning use. Calibration is beneficial particularly because at some level of comparison, no two components of the multi-mode scanning camera systems are the same. Components that contribute to differences in system performance include scanning arrays of the linear imaging camera and light sources with tolerances that vary from a norm. It is unimportant to the system and method of the Application if the light sources are integral to the body of the linear imaging camera, separately mounted lights sources, or a combination thereof.

Color calibration typically includes a scanned sheet of white paper scanned at some nominal level of white light (either a white LED, or RGB LEDs set nominally to white). Calibration can be performed to the pixel level, calibrating each pixel of a linear scanning array for gain and offset for each of the three scanner channels R, G, and B. Calibration at each color and intensity for each pixel is complete when the registered detector pixel values match a desired value within a specified tolerance for a given calibration target, typically a white page for gain and offset. Calibration can be performed initially (e.g., a new scanner setup either at the factory or in the field) and/or periodically, e.g., to compensate for light source aging (e.g., individual LED aging).

The scanning linear area includes a R, G, and B detector for each pixel position. typically, there are rows of R, G, and B detectors, where there is also built into the system corresponding delays for move scanned papers, some microseconds corresponding to the physical travel of a page being scanned across the offset rows of R, G, and B detectors.

There can also be two or more calibration runs at two or more different light intensity levels. Black levels can be calibrated under substantially no light illumination of the white paper.

IR calibration can be similar, scanning a white paper under a nominal intensity from the IR light source.

The multi-mode scanning camera system calibration process compensates for differences in linear scanner array (pixel to pixel), light source, and even variations in lenses.

Figure 4A:
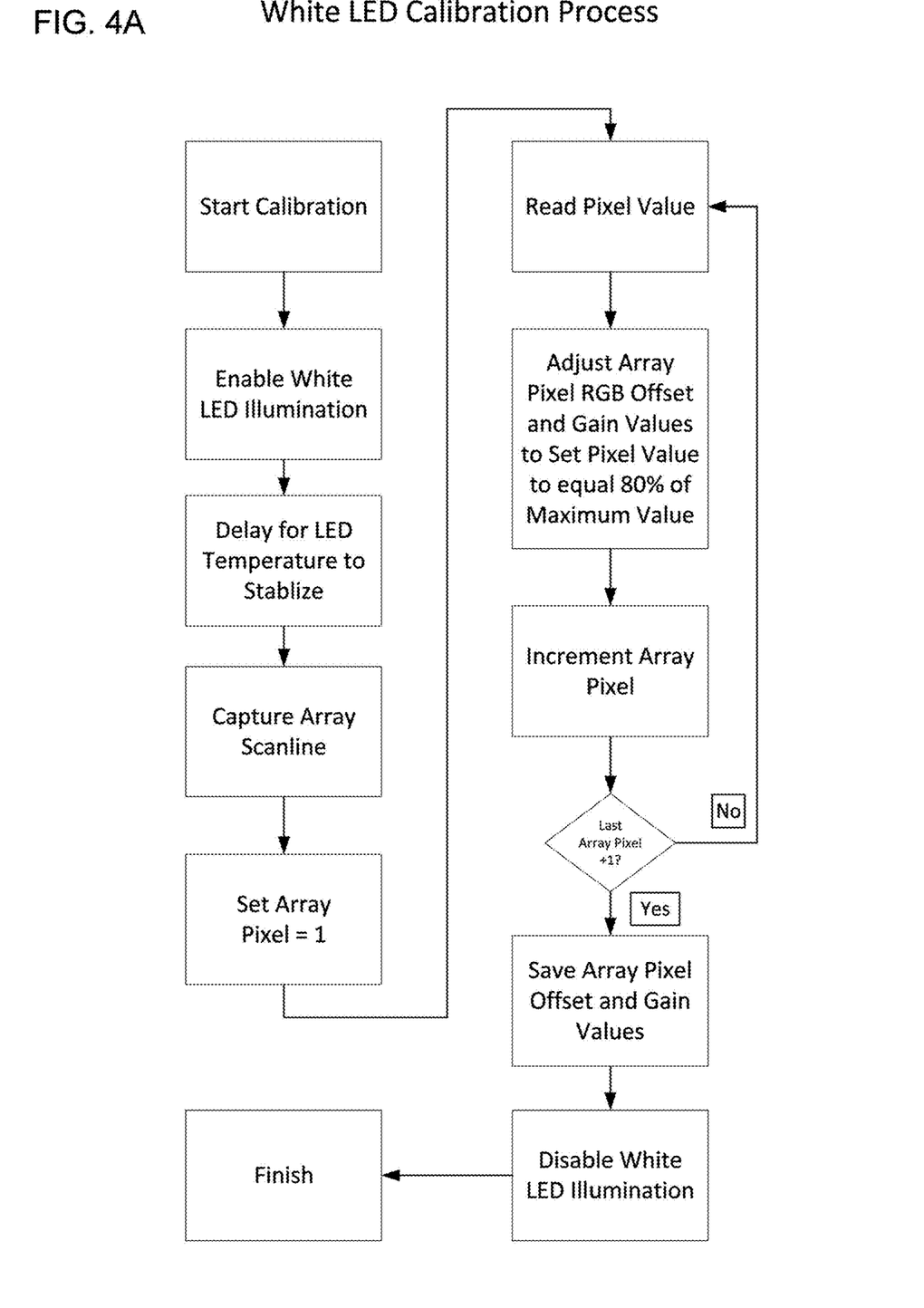
FIG. 4A is a flow chart showing an exemplary white LED calibration process.
Figure 4B:
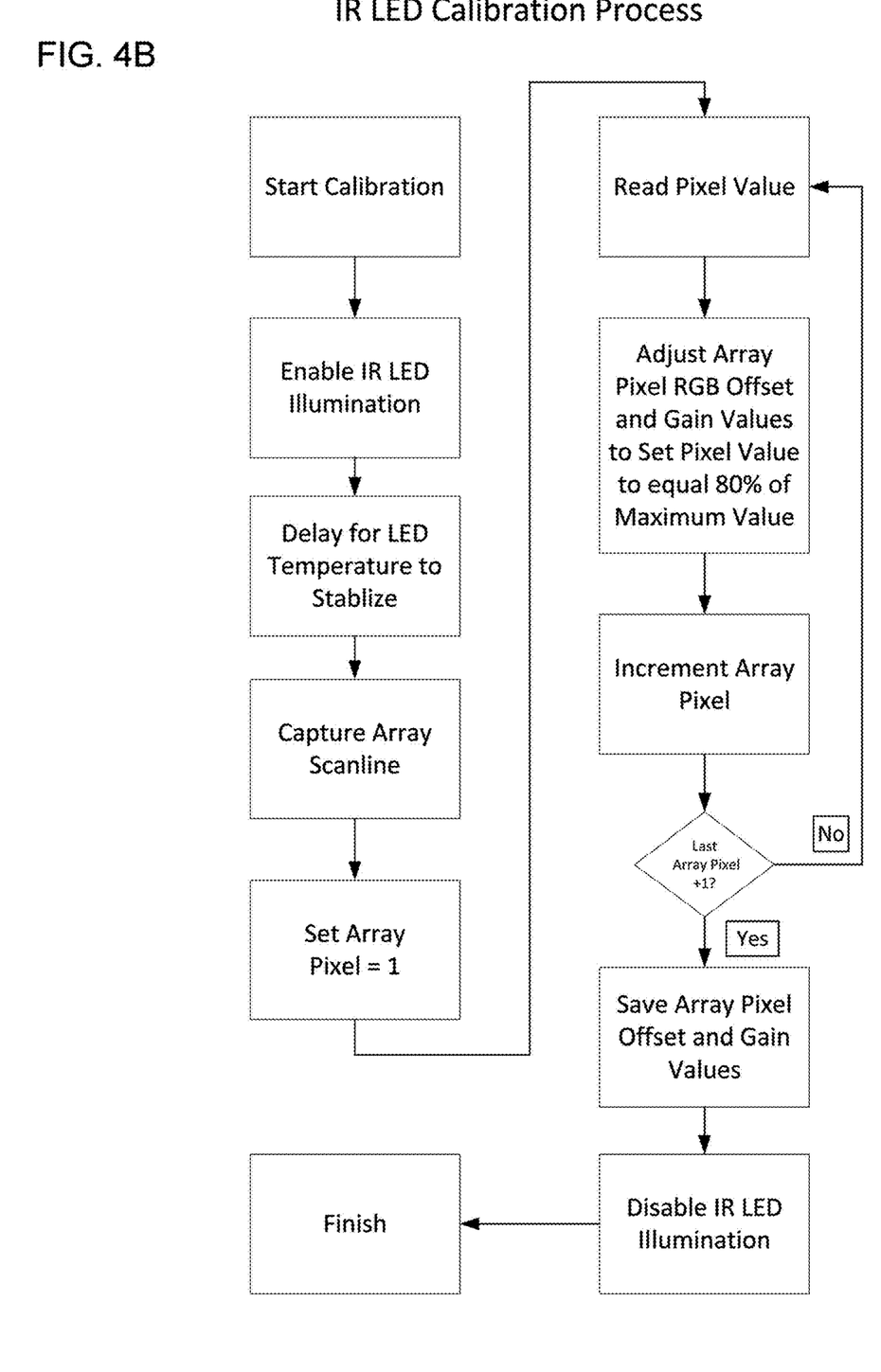
FIG. 4B is a flow chart showing an exemplary IR LED calibration process.
Figure 4C:
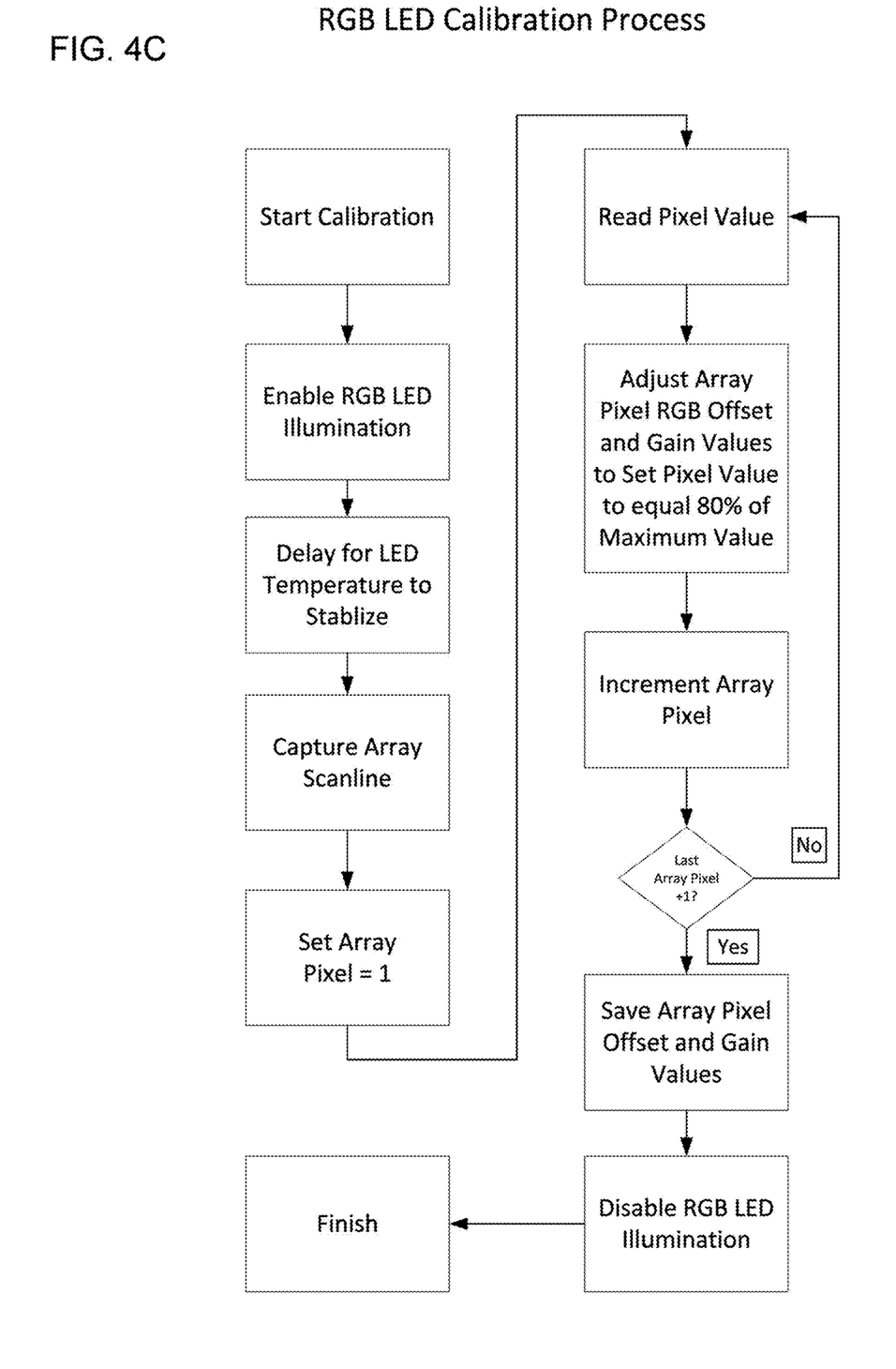
FIG. 4C is a flow chart showing an exemplary RGB LED calibration process.
Figure 4D:
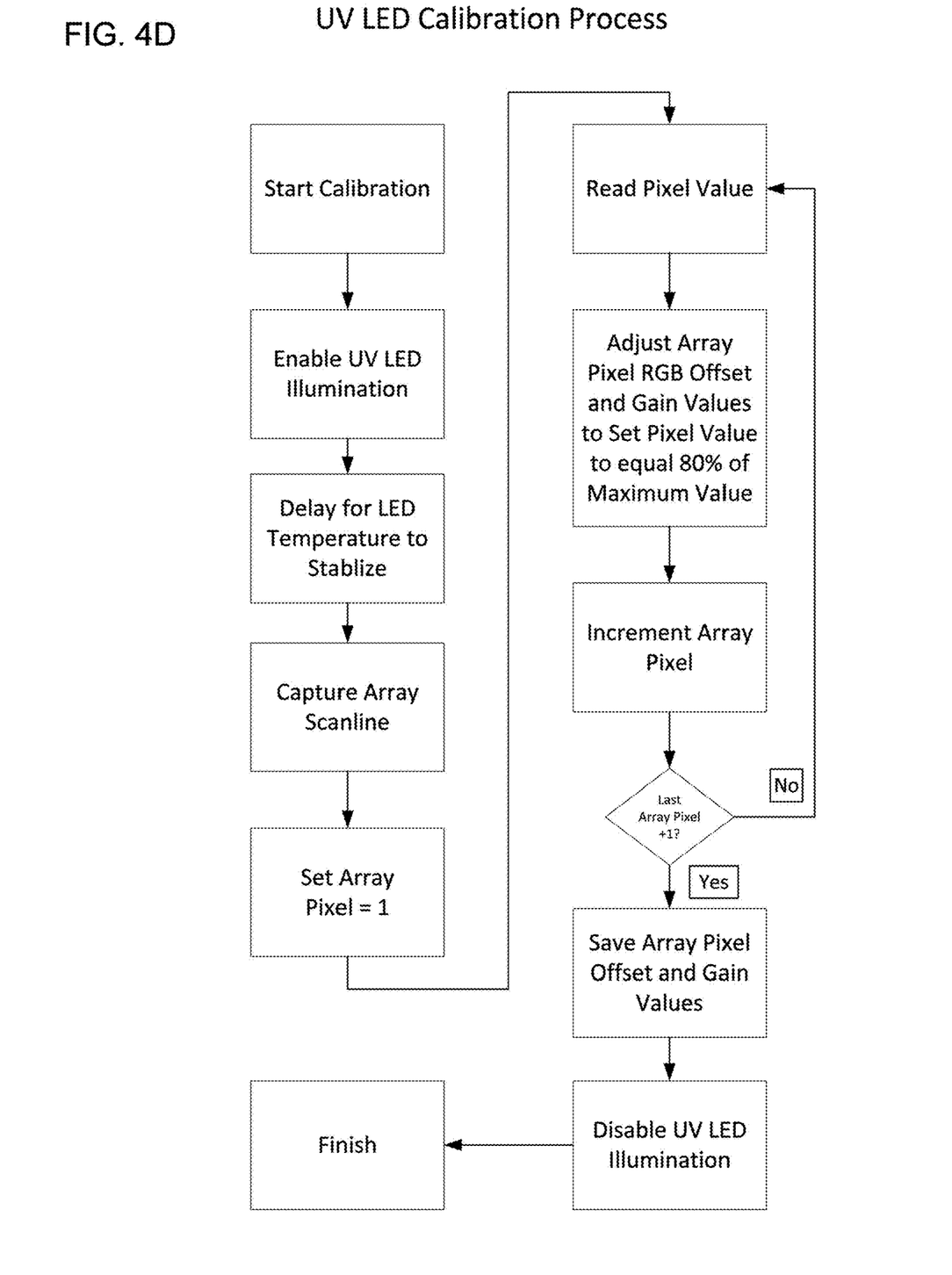
FIG. 4D is a flow chart showing an exemplary UV LED calibration process.

FIG. 4A to FIG. 4D are flow charts showing exemplary calibration process algorithms suitable for calibrating a highspeed scanner according to the Application for color or other visible light scanning applications (FIG. 4A white, FIG. 4C RGB), IR applications (FIG. 4B), and visible light scanning of light of UV excited visible light (FIG. 4D).

FIG. 4A is a flow chart showing an exemplary white LED calibration process. The white LED calibration process includes, starting calibration, enabling (turn on) the white LED illumination, delaying for LED temperature to stabilize, capturing an array scanline, setting array pixel to 1, reading the pixel value, adjusting array pixel RGB offset and gain values to set pixel value to equal 80% of maximum value, incrementing array pixel, check last array pixel +1?, if no repeat steps from reading pixel value, if yes, save array pixel offset and gain values, and disable (turn off) the white LED illumination.

FIG. 4B is a flow chart showing an exemplary IR LED calibration process. The IR LED calibration process includes, starting calibration, enabling (turn on) the IR LED illumination, delaying for LED temperature to stabilize, capturing an array scanline, setting array pixel to 1, reading the pixel value, adjusting array pixel RGB offset and gain values to set pixel value to equal 80% of maximum value, incrementing array pixel, check last array pixel +1?, if no repeat steps from reading pixel value, if yes, save array pixel offset and gain values, and disable (turn off) the IR LED illumination.

FIG. 4C is a flow chart showing an exemplary RGB LED calibration process. The RGB LED calibration process includes, starting calibration, enabling (turn on) the RGB LED illumination, delaying for LED temperature to stabilize, capturing an array scanline, setting array pixel to 1, reading the pixel value, adjusting array pixel RGB offset and gain values to set pixel value to equal 80% of maximum value, incrementing array pixel, check last array pixel +1?, if no repeat steps from reading pixel value, if yes, save array pixel offset and gain values, and disable (turn off) the RGB LED illumination.

FIG. 4D is a flow chart showing an exemplary UV LED calibration process. The UV LED calibration process includes, starting calibration, enabling (turn on) the UV LED illumination, delaying for LED temperature to stabilize, capturing an array scanline, setting array pixel to 1, reading the pixel value, adjusting array pixel RGB offset and gain values to set pixel value to equal 80% of maximum value, incrementing array pixel, check last array pixel +1?, if no repeat steps from reading pixel value, if yes, save array pixel offset and gain values, and disable (turn off) the UV LED illumination.

An important realization was that the RGB color filters used in the CCD imager typically pass IR wavelengths as well through the RGB color filters. In the past, when illumination sources were incandescent, halogen, or fluorescent (which emitted some levels of IR light), an IR filter was used in the optical path to block the IR. However, white light sources based on LED illumination do not emit IR, so we realized that the IR filter can now be removed. With the IR filter now removed, or not present, the same RGB imager can be used for both normal color scanning (w/o IR interference) and for IR scanning.

It was also the realization that calibration should be included which made possible a multimode scanner according to the Application practical, substantially optimizing what previously would have been either a dedicated IR (e.g., for test scoring) machine or a dedicated color document scanner into a single more cost-efficient multimode scanning apparatus. Also, the realization of being able to calibrate for each mode, store the settings for each, and switch between them when switching modes led to the multimode scanner of the Application.

In some embodiments, if it is unknown what type of marking will be present, the system can rapidly alternate between the multiple illumination sources and capture multiple images which can either substantially in real-time, or later be reviewed electronically or by human intervention, to select the light type which most accurately captures the markings desired.

In another exemplary implementation, one or more light banks can have multiple series of different types of lights (e.g., parallel rows of LEDS, such as IR, UV, and White and/or RGB). If the rows are proximate to each other, the resulting illumination profile hitting the document is more or less the same. The multiplexing of the light elements to be illuminated, is the same, i.e., it is either user selectable or can be discriminated by illuminating alternately during the scan, capturing multiple images and determining which scan is more appropriate later. Software processes, such as, for example, including artificial intelligence, can also be used to make such a determination as well as based on the assumption that if more data is captured by a particular type of illumination, it is probable that that is the preferred scan capture.

Figure 5:
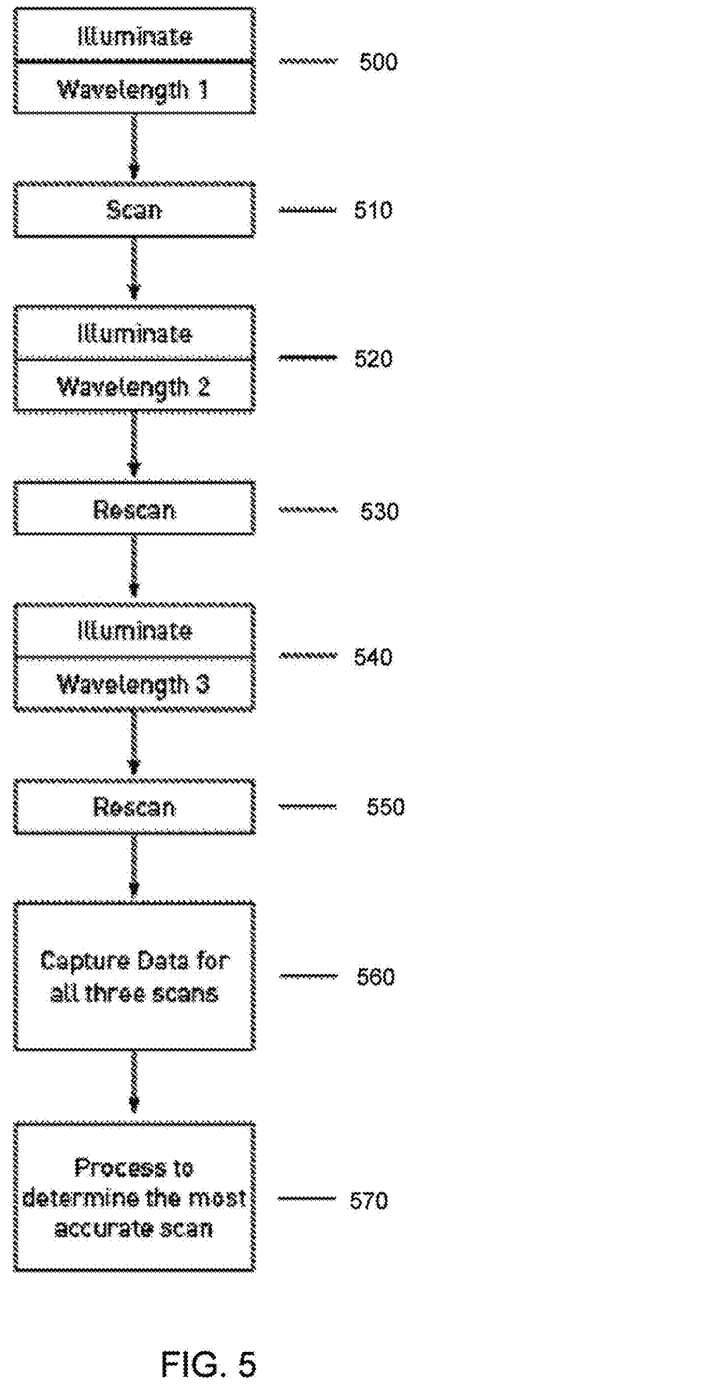
FIG. 5 is a flow chart of an exemplary scanning procedure according to the Application.

FIG. 5 is a flow chart of one of the processes which are possible under this disclosure. Step 500 is illumination of the document under scanning with the multi-wavelength light source/bar using wavelength 1. Step 510 is scanning a line/portion of the document under this wavelength. Step 520/530 is rescanning the same portion under wavelength 2. Step 540/550 is rescanning the same portion under wavelength 3. By multiplexing the light source and data capture fast enough the document does not have to be moved back to its original position as both scans can occur in the same pass. In other embodiments, the scan is done only on one wavelength because of user or data input which has determined which wavelength is optimal. Step 560 is to take the scan data corresponding to three captures of the document at different illumination wavelengths and step 570 is processing the data to determine which scan is most likely to have captured the best/most complete data. This can be done in many ways. For examiner, user input could be supplied from a database indicating whether the document would be best capture by wavelength 1, 2 or 3, such as a test score with pencil markings.

Alternatively, AI (an artificial intelligence) algorithm may be employed to determine which data is more likely to capture the desired information. For example, the layout of the imprint on the document can provide a powerful clue as to whether this is a test sheet in which case graphite markings are to be captured at the appropriate wavelength. The software can be programmed with typical layouts or elements which provide clues of the nature of the document. For example, small adjacent empty enclosed shapes/circles/ovals, would likely indicate a test scored with a pencil.

The System employs a common camera that can be switched between 4 modes of operation:

normal color linear camera with white illumination and RGB output that can be used in standard document scanners;

an Infrared (IR) mode where IR illumination is used to enable processing of specific document types, such as scholastic test sheets, where the printed form information needs to be suppressed (dropped out) while the filled in content (bubbles filled out w/ #2 pencil) needs to be retained;

an Ultraviolet (UV) mode where UV illumination is used to enable processing of specific document types, such as transactional sheets with security markings, where the printed form information needs to be suppressed (dropped out) while the security content needs to be retained;

any combination of the illumination modes where 2 or more illumination sources are illuminated simultaneously to enable a scanned image with merged content.

The system uses a camera with a tri-linear CCD sensor that has 3 channels with corresponding Red (R), Green (G), and Blue (B) filters, enabling color capture of images. At least one of the 3 color filters also passes infrared (IR) wavelengths of light (in the current embodiment, all 3 channels have response to IR light). Illumination to the documents is provided by a line source of Light Emitting Diodes (LEDs) that contain white, IR, and ultraviolet (UV) LEDs interspersed on a circuit board. Instead of using white LEDs, an alternative would be using individual red (R), green (G), and blue (B) LEDs. A lens in front of the CCD focuses individual scan lines from the document onto the CCD sensor, enabling capture of scan lines with red, green, blue, and IR wavelengths. A transport then moves documents across the camera to capture a plurality of scan lines to form a document image.

When the system runs as a standard visible scanner, the white or individual RGB LEDs are powered and used to illuminate the documents. The resulting images from the system will be normal color images.

When the system runs as an IR Scanner, the IR LEDs are powered and used to illuminate the documents, and the resulting grayscale images will be white/light for areas of the document that reflect IR light and black/dark for areas that absorb IR light. As such, the system can be used to discern between printed form content (reflects IR light) and pencil or other writing instruments used to mark/fill in the form (absorbs IR light).

When the system is used to detect inks or toners that react to UV light (such as security markings), the RGB or white LEDs are powered in conjunction with the UV LEDs. Any content on the document that reacts to UV excitation will generate a visible output in the RGB range, and this content will be captured by the scanner as additional color information (in addition to whatever other color content is present in the document).

There is disclosed a multi-mode document scanning system having any or all of the following elements:
  a scanning bed for transporting documents to a scanning area;
  a scanning camera, said camera configured to image documents using visible, ultraviolet, infrared, or other illumination;
  at least one illumination bank, said at least one bank including a plurality of illumination elements of different light wavelengths or broadband illumination, such as white Light Emitting Diodes (LEDs), said element being interspersed along the length of the bank;
  a controller for switching on and off elements of one wavelength simultaneously,
  so that a user can select an appropriate wavelength, and instruct the controller to illuminate elements of only that wavelength.

Also disclosed is a multi-mode document scanning system having any or all of the following elements:
  a scanning bed for transporting documents to a scanning area;
  a scanning camera, said camera configured to image documents using visible, ultraviolet, infrared, or other illumination;
  at least one illumination bank, said at least one bank including a plurality of illumination elements of different light wavelengths, said element being interspersed along the length of the bank;
  a controller for switching on and off elements of one wavelength simultaneously, scanning the document with elements of the first wavelength only and alternatively scanning the document with elements of one of the other wavelengths only.

Also disclosed is a scanning system further including a comparator to compare the scans from each of the various wavelengths and determining which scan contains the most relevant data, and flagging said scan with most relevant data.

Also disclosed is a scanning system wherein said first wavelength is visible light and the second wavelength is infrared light and wherein said comparator compare the scans from the first wavelength with the second wavelength and determining if the scan contains the infrared responsive data, and flagging said scan with data. Also disclosed is a scanning system wherein said first wavelength is visible light and the second wavelength is ultraviolet light and wherein said comparator compare the scans from the first wavelength with the second wavelength and determining if the scan contains the ultraviolet responsive data, and flagging said scan with data.

A method of accomplishing this determination would be done as follows: the algorithm would scan images and detect the presence of data at predefined wavelengths (Visible, Ultraviolet, and Infrared) and authenticate said data. Prior knowledge of the various parameters and features of the desired data to be scanned is used, including wavelength. First, the wavelength of the illumination and the wavelength of the camera's optical path/lens/array should be appropriate to allow the data to be seen by the imaging system and differentiated from data at other wavelengths. A single wavelength illumination source or a combination of illumination sources of different wavelengths can be used. A single pass of the data to be scanned or multiple passes at different wavelengths can be used. The algorithm would compare known specified features of the desired data to those of the scanned image using positional data, geometric data, font data, encoded data, density data, and any other appropriate method of validation. Finally, the algorithm would have a method of scoring the correlation between the desired data and the actual image data scanned and determining if an acceptable qualification threshold has been exceeded. If this threshold has been exceeded, then the data can be flagged as valid data, responsive of the desired wavelength.

Also disclosed is a scanning system wherein the controller is configured to switch between light elements fast enough that a document can be illuminated and scanned by both wavelengths as it passes by the camera.

Also disclosed is a scanning method including any or all of the following steps in any order positioning a document on a scanning bed, positioning a scanning camera above the scanning bed; configuring the scanning camera, to image documents using visible, ultraviolet, infrared, or other illumination; alternatively illuminating the document from a light bank containing illuminating elements of first, second and third light wavelengths, said element being interspersed along the length of the light bank; switching on and off elements of each wavelength alternately, scanning the document with elements of the first wavelength only, and simultaneously scanning the document with elements of the second wavelength only, and simultaneously scanning the document with elements of the third wavelength only.

Also disclosed is a scanning method further including processing of data received from the scanning camera and determining which data, from the first, second or third wavelengths is the one which contains the most useful data and flagging that data. Also disclosed is a scanning method further including processing of data received from the scanning camera, retrieving data indicating the type of document data which is to be collected and determining which data, from the first, second or third wavelengths more likely the one which contains the data to be collected based on the type of document data, and flagging that scan.

Software and/or firmware for processes of a multi-mode scanning camera system and method according to the Application can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-mode document scanning system comprising:
   a scanning bed configured to transport a plurality of documents through a scanning area;
   a scanning camera configured to image the documents;
   at least one illumination bank comprising a plurality of illumination elements of at least two different light wavelengths interspersed on at least one illumination bank;
   an illumination source switching assembly to control at least some elements of one wavelength;
   a white light source and an IR light source, or comprising a R light source, a G light source, a B light source, and said IR light source;
   a UV light source, wherein a corresponding UV illumination of the documents causes a visible light detectable by said scanning camera; and
   a selection process to select a wavelength appropriate to a document to be scanned, and instruct a processor operatively coupled to said illumination source switching assembly to illuminate elements of that wavelength;
   wherein said selection process to select the wavelength appropriate to the documents to be scanned comprises a graphical user interface allowing the user to manually select the wavelength; and
   wherein the illumination source switching assembly is configured to switch between the light sources to allow the document to be illuminated and scanned by multiple wavelengths in one pass by the scanning camera.

2. The multi-mode document scanning system of claim 1, wherein said scanning camera comprises a linear scanner.

3. The multi-mode document scanning system of claim 2, wherein said linear scanner comprises a linear RGB CCD scanner.

4. The multi-mode document scanning system of claim 3, wherein said linear RGB CCD scanner comprises separate rows of R detector pixels, G detector pixels, and B detector pixels.

5. The multi-mode document scanning system of claim 4, wherein said multi-mode document scanning system further includes a delay process to account for a physical distance between each of a row of R detector pixels, a row of G detector pixels, and a row of B detector pixels.

6. The multi-mode document scanning system of claim 1, wherein said plurality of illumination elements of at least two different light wavelengths are interspersed along a length of said at least one illumination bank.

7. A multi-mode scanning method of document scanning comprising:
   positioning a document on a scanning bed, positioning a scanning camera above the scanning bed;
   configuring the scanning camera to detect visible or infrared illumination from the document to be scanned;
   alternatively illuminating the document from a light bank containing illuminating elements of an IR wavelength or a visible light wavelength;
   controlling a UV light source wherein a scanning camera detects a visible light from the document as detected by said scanning camera; and
   controlling elements of each wavelength corresponding to a type of document being scanned as set by a selection process to select a wavelength appropriate to the document to be scanned;
   wherein said selection process to select the wavelength appropriate to the documents to be scanned comprises a graphical user interface allowing the user to manually select the wavelength; and
   wherein the illumination source switching assembly is configured to switch between the light sources to allow the document to be illuminated and scanned by multiple wavelengths in one pass by the scanning camera.

* * * * *